(12) United States Patent
Liu et al.

(10) Patent No.: US 12,169,460 B2
(45) Date of Patent: Dec. 17, 2024

(54) REMOTE TRAFFIC PERFORMANCE ON CLUSTER-AWARE PROCESSORS

(71) Applicant: Intel Corporation, Santa Clara, CA (US)

(72) Inventors: Shijie Liu, Shanghai (CN); Tao Xu, Shanghai (CN); Lei Zhu, Shanghai (CN); Yufu Li, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/040,944

(22) PCT Filed: Sep. 18, 2020

(86) PCT No.: PCT/CN2020/116037
§ 371 (c)(1),
(2) Date: Feb. 7, 2023

(87) PCT Pub. No.: WO2022/056798
PCT Pub. Date: Mar. 24, 2022

(65) Prior Publication Data
US 2023/0289303 A1     Sep. 14, 2023

(51) Int. Cl.
*G06F 13/16* (2006.01)
*G06F 13/10* (2006.01)
*G06F 13/42* (2006.01)

(52) U.S. Cl.
CPC ........ *G06F 13/1652* (2013.01); *G06F 13/102* (2013.01); *G06F 13/4221* (2013.01)

(58) Field of Classification Search
None
See application file for complete search history.

(56) References Cited

U.S. PATENT DOCUMENTS

| 2012/0072621 A1 | 3/2012 | Droux et al. |
| 2019/0018815 A1* | 1/2019 | Fleming ................ G06F 9/5027 |

(Continued)

FOREIGN PATENT DOCUMENTS

| CN | 106293944 A | 1/2017 |
| CN | 108075949 A | 5/2018 |

OTHER PUBLICATIONS

International Patent Application No. PCT/CN2020/116037 "International Preliminary Report on Patentability" mailed Mar. 30, 2023, 5 pages.

(Continued)

*Primary Examiner* — Scott C Sun
(74) *Attorney, Agent, or Firm* — JAFFERY WATSON MENDONSA & HAMILTON LLP

(57) ABSTRACT

Embodiments are directed to improving remote traffic performance on cluster-aware processors. An embodiment of a system includes at least one processor package comprising a plurality of processor ports and a plurality of system agents; and a memory device to store platform initialization firmware to cause the processing system to: determine first locations of the plurality of processor ports in the at least one processor package; determine second locations of the plurality of system agents in the at least one processor package; associate each of the processor ports with a set of the plurality of system agents based on the determined first and second locations; and program the plurality of system agents with the associated processor port for the respective system agent.

20 Claims, 8 Drawing Sheets

(56) References Cited

U.S. PATENT DOCUMENTS

2019/0050361 A1    2/2019  Raghava et al.
2020/0310988 A1*  10/2020  Keepers .............. G06F 12/0813

OTHER PUBLICATIONS

Mahajan, Ravi et al. "Embedded Multi-Die Interconnect Bridge (EMIB)—A High Density, High Bandwidth Packaging Interconnect", 2016 IEEE 66th Electronic Components and Technology Conference (ECTC), Aug. 18, 2016 (Aug. 18, 2016).
International Patent Application No. PCT/CN2020/116037 "International Search Report" mailed Jun. 17, 2021, 3 pages.
International Patent Application No. PCT/CN2020/116037 "Written Opinion of the International Searching Authority" mailed Jun. 17, 2021, 3 pages.

* cited by examiner

700

---

Determine locations of CPU ports and system agents in a local CPU package
710

↓

Bind the system agents to the CPU ports in the local CPU package based on the determined locations of the CPU ports and system agents
720

↓

Modify a cluster memory mapping of cores of the local CPU package to combine same clusters of the local CPU package with corresponding remote clusters of a remote CPU package
730

↓

Program system agents, including cores, with associated CPU port to which the system agents are bound and program the cores with modified cluster memory mapping
740

REMOTE TRAFFIC PERFORMANCE ON CLUSTER-AWARE PROCESSORS

CROSS-REFERENCE TO RELATED APPLICATIONS

The present application is a national stage application, filed under 35 U.S.C. § 371 of International Patent Application No. PCT/CN2020/116037 entitled "IMPROVING REMOTE TRAFFIC PERFORMANCE ON CLUSTER-AWARE PROCESSORS" filed Sep. 18, 2020, the content of which is incorporated by reference in its entirety herein.

TECHNICAL FIELD

Embodiments described herein generally relate to the field of processing systems and, more particularly, to improving remote traffic performance on cluster-aware processors.

BACKGROUND

As part of improving processor performance, large processor (e.g., central processing unit (CPU)) packages are being introduced. As CPU package size increases, so do the number of cores in the CPU, the number of peripheral component interconnect express (PCIe) lanes in the CPU, the number of memory controllers in the CPU, and the number of management system agents in the CPU. In some cases, two CPU platforms, four CPU platforms, or even eight CPU platforms are provided in computing systems, which results in an increased number of CPU ports within the CPU.

Remote traffic refers to the communications among different CPU packages. Remote traffic can be transmitted via CPU ports. As CPU packages increase in size, the number of the system agents in the CPU also increases, which introduces the challenge of communicating efficiently among the system agents. System agents may refer to, for example, the cores, memory controller, PCIe controllers, system management agents, etc. in the CPU package. Due to the size and number of system agents, the traffic internal and external to the CPU package costs more in terms of time of communication.

BRIEF DESCRIPTION OF THE DRAWINGS

Embodiments described here are illustrated by way of example, and not by way of limitation, in the figures of the accompanying drawings in which like reference numerals refer to similar elements.

FIG. 7 illustrates an example flow for improving remote traffic performance on cluster-aware processors, in accordance with implementations of the disclosure.

DETAILED DESCRIPTION

Figure 1:
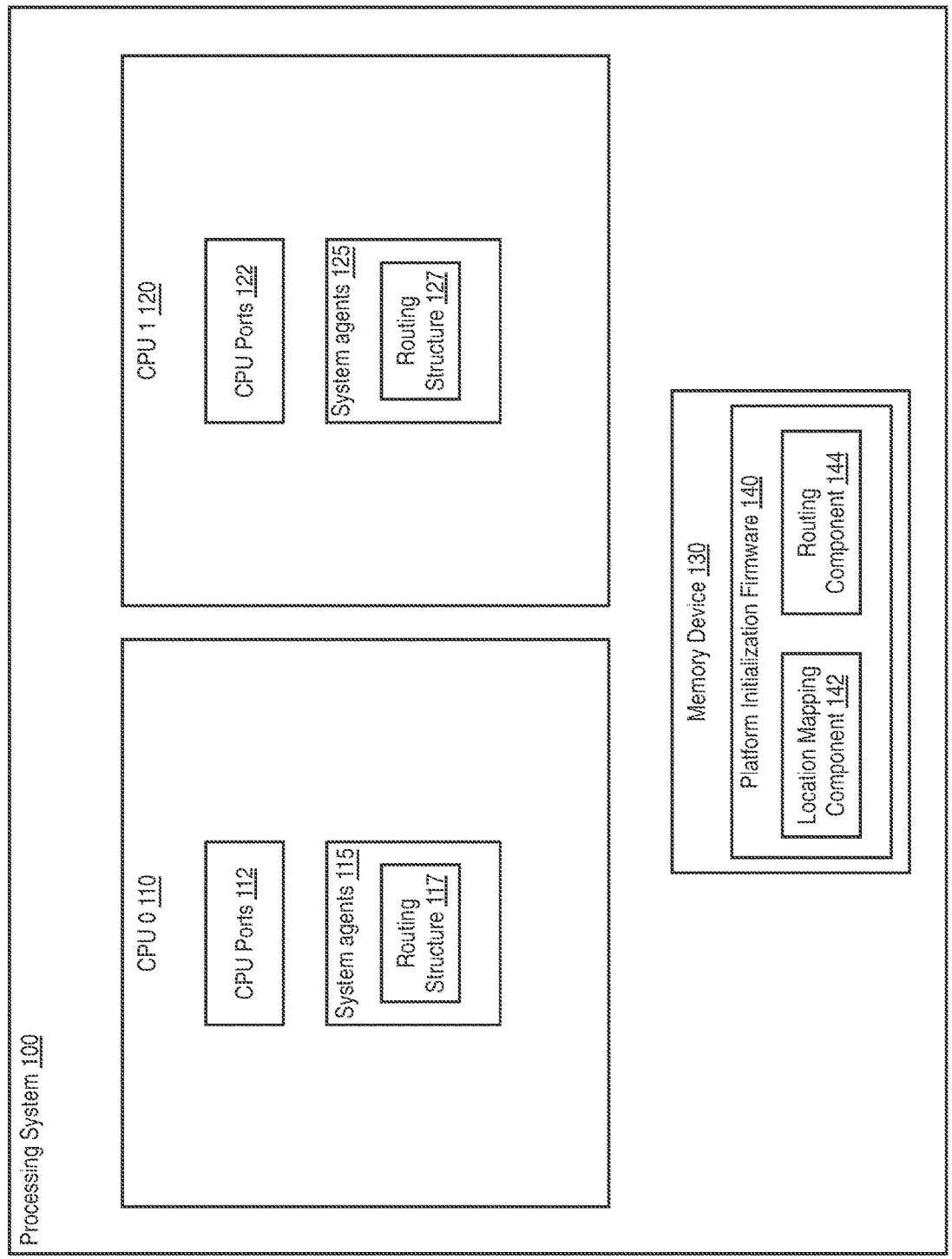
FIG. 1 depicts an illustration of a processing system to provide improving remote traffic performance on cluster-aware processors, in accordance with implementations of the disclosure.

Embodiments described herein are directed to improving remote traffic performance on cluster-aware processors.

As part of improving processor performance, large processor (e.g., central processing unit (CPU)) packages are being introduced. A processor package or CPU package may refer to a unit that includes one or more processors, CPUs, and/or processor dies. For example, two CPUs may reside in a single processor package or two separate processor packages. As CPU package (also referred to as "processor package" herein) size increases, so do the number of cores in the CPU, the number of peripheral component interconnect express (PCIe) lanes in the CPU, the number of memory controllers in the CPU, and the number of management system agents in the CPU. In some cases, two CPU platforms, four CPU platforms, or even eight CPU platforms are provided in computing systems, which results in an increased number of CPU ports (also referred to as "processor ports" herein) within the CPU. The CPU port may be interconnection that enables communicative connection between CPU packages within a computing system. One example CPU port may be an Ultra Path interconnection (UPI) port. The communications between CPU packages may be referred to as "remote traffic" herein.

Remote traffic refers to the communications among different CPU packages. Remote traffic can be transmitted via CPU ports. Remote traffic can include, but is not limited to, memory accesses (e.g., a core in a CPU wants to access the memory attached to another CPU), input/output (I/O) accesses (e.g., a core in a CPU wants to access the PCIe devices attached to another CPU), coherency maintain messages (e.g., snoops), interrupt messages, inter-processor interrupt (IPI), and so on.

As CPU packages increase in size, the number of the system agents in the CPU also increases, which introduces the challenge of communicating efficiently among the system agents. System agents may refer to, for example, the cores, memory controllers, PCIe controllers, system management agents (e.g., Cache and Home agent (CHA)), to name a few examples, in the CPU package. In one example, a single CPU package may include 40 cores, 6 PCIe controllers, 4 memory controllers, 4 CPU ports, and 40 system management agents. As such, this example CPU package includes approximately 100 system agents. Due to the size and number of system agents, the traffic within the CPU package (e.g., from one corner to another corner) costs more in terms of time of communication.

Furthermore, a larger CPU package is also a challenge for CPU manufacturers. The larger CPU package entails a higher yield on the CPU factory, which is not easy and is also costly. For better yield, a split die architecture can be provided where the large CPU package is combined with several smaller split dies. Currently, the split die architecture is a trending direction for CPU designers.

In one example, a split die architecture may include a CPU package with four split-dies. The split dies can be connected via a special interface with each other to form the CPU package. The connection between the dies may be referred to as a multi-die link (MDL) (also referred to as a "die-to-die fabric" or "multi-die fabric"). The MDL may not be as fast as the connection (e.g., mesh) among the system agents within the individual dies. To enable the MDL connection between the dies, there may be two buffers implemented in each die to send and receive the cross-die transactions. Initially, the transactions reach the source die's send buffer and are encoded in the specific protocol used to send to the target die over the MDL. Once the messages reach the target die, they are decoded and received by the target die's receive buffer. As a result, cross-die transactions experience more latency than transactions within (i.e., internal to) a die. For example, in some multi-die architectures, a single MDL crossing may experience around 7 ns latency, and around 14 ns latency for two MDL crossings (e.g., a transaction from a core tile in a first die of a CPU package crossing a first MDL to go through a second die of the CPU package to then cross a second MDL to get to a CPU port of a third die of the CPU package, where that destination CPU port is used to communicate the remote traffic of the originating core tile of the first die).

The remote traffic that targets a remote CPU (external to the CPU package) can be routed to a local CPU port to reach the target remote CPU. IN conventional systems, the routing rule depends on the system topology. For example, in a mainstream topology of a two socket platform (i.e., two CPU packages), there can be more than one link between the two CPUs for better performance, such as 2 CPUs with 2 CPU ports, 2 CPUs with 3 CPU ports, or 2 CPUs with 4 CPU ports. In these topologies, remote transactions can be routed to each local CPU port evenly to keep the remote traffic balanced. Generally, the CPU ports are in the peripheral of the CPU package for the performance consideration (e.g., core and system management agents are placed closely for better performance). This means that if a remote traffic from a core or any other system agent is routed to the CPU package's opposite corner CPU port, the transaction has to go through from the requester to the farthest corner. This can be a long distance in a large CPU and can increase communication latency. This problem also occurs on a CPU package having a multi-die architecture, as the transaction travels through the cross-die MDL.

Furthermore, the above-noted problem is accentuated when a cluster mode is enabled. A cluster mode is used to improve local memory access performance on a CPU package. The cluster mode divides the management system agents and memory controllers (including the cores) into several clusters, which have an even account of the system agents. The cores and management system agents in a cluster can access the memory controller in the same cluster with full bandwidth, which utilizes the maximum transaction capability among the core, the management system agents and the memory controllers in the same cluster. However, the clustering mode does not include the CPU ports in each cluster. For example, if the remote traffic is routed to a CPU port that is far away from the cluster, the latency to reach the CPU port is large as the remote traffic crosses a long distance and multiple MDL connections between the split dies. Additionally, after the remote traffic reaches the target remote CPU's CPU port, the remote transaction is routed to the same system management agent on the remote CPU, which also does not consider the CPU port's location. The transaction on the target CPU therefore experiences the same situation.

As a result, in a cluster mode, local memory access performance is improved, but there is a non-negligible latency increase experienced for remote traffic transactions. This is because the CPU ports are not binding to the clusters and the remote traffic is routed to all of the CPU ports on a CPU package evenly for balance. For example, 75% of the remote traffic may cross the MDL (or traverse a long distance) and be sent out via CPU ports that are far away from the requester, which impacts the system performance by increasing communication latency.

Implementations of the disclosure address the above technical problems by providing improved remote traffic performance on multi-socket and/or cluster-aware processors Implementations of the disclosure provide a method to detect CPU ports' locations in the CPU package and combine (e.g., bind) CPU ports with their adjacent system agents (such as the system management agents, memory controllers, and the cores) within the CPU package. As a result, any remote traffic sent by the system agents is sent out via the nearest bound CPU port. In addition, the return/completion messages can also be routed back via the nearest bound CPU port on the remote CPU. This is an efficient path for the remote traffic request and remote traffic return message among the CPUs.

Implementations of the disclosure improve system performance and communication latency of processor packages in a processing system. Specifically, implementations of the disclosure improve remote traffic performance on multi-socket and/or cluster-aware processors. By improving remote traffic performance, implementations of the disclosure improve overall system performance and responsiveness.

FIG. 1 depict an illustration of a processing system 100 to provide improved remote traffic performance on cluster-aware processors, according to some embodiments. As illustrated in FIG. 1, processing system 100 may be embodied as and/or may include any number and type of hardware and/or software components, such as (without limitation) a processor, including but not limited to, a central processing unit ("CPU" or simply "application processor"), a graphics processing unit ("GPU" or simply "graphics processor"), and so on. Processing system 100 may also include components such as drivers (also referred to as "driver logic", user-mode driver (UMD), UMD, user-mode driver framework (UMDF), UMDF, "GPU driver", "graphics driver logic", or simply "driver"), memory, network devices, or the like, as well as input/output (I/O) sources, such as touchscreens, touch panels, touch pads, virtual or regular keyboards, virtual or regular mice, ports, connectors, etc. Although not specifically illustrated, processing system 100 may include or enable operation of an operating system (OS) serving as an interface between hardware and/or physical resources of the processing system 100 and a user.

It is to be appreciated that a lesser or more equipped system than the example described above may be utilized for certain implementations. Therefore, the configuration of processing system 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or combinations of software and hardware.

In one implementation, processing system 100 may be part of a communication and data processing device including (but not limited to) smart wearable devices, smartphones, virtual reality (VR) devices, head-mounted display (HMDs), mobile computers, Internet of Things (IoT) devices, laptop computers, desktop computers, server computers, etc.

Processing system 100 may further be a part of and/or assist in the operation of (without limitations) an autonomous machine or an artificially intelligent agent, such as a mechanical agent or machine, an electronics agent or machine, a virtual agent or machine, an electromechanical agent or machine, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Throughout this document, "computing device" may be interchangeably referred to as "autonomous machine" or "artificially intelligent agent" or simply "robot".

It contemplated that although "autonomous vehicle" and "autonomous driving" are referenced throughout this document, embodiments are not limited as such. For example, "autonomous vehicle" is not limed to an automobile but that it may include any number and type of autonomous machines, such as robots, autonomous equipment, household autonomous devices, and/or the like, and any one or more tasks or operations relating to such autonomous machines may be interchangeably referenced with autonomous driving.

Processing system 100 may further include (without limitations) large computing systems, such as server computers, desktop computers, etc., and may further include set-top boxes (e.g., Internet-based cable television set-top boxes, etc.), global positioning system (GPS)-based devices, etc. Processing system 100 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, processing system 100 may include a mobile computing device employing a computer platform hosting an integrated circuit ("IC"), such as system on a chip ("SoC" or "SOC"), integrating various hardware and/or software components of processing system 100 on a single chip.

Processing system 100 may host network interface(s) (not shown) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In one embodiment, processing system 100 can include, a single processor desktop system, a multiprocessor workstation system, or a server system having a large number of processors or processor cores. In one embodiment, the processing system 100 can be a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 100 may couple with, or be integrated within: a server-based gaming platform; a game console, including a game and media console; a mobile gaming console, a handheld game console, or an online game console. In some embodiments the processing system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, processing system 100 includes or is part of a television or set top box device. In one embodiment processing system 100 can include, couple with, or be integrated within a self-driving vehicle such as a bus, tractor trailer, car, motor or electric power cycle, plane or glider (or any combination thereof). The self-driving vehicle may use processing system 100 to process the environment sensed around the vehicle.

In some embodiments, the processing system 100 includes one or more processors, such as a CPU (e.g. host CPU 110) or GPU, which each include one or more processor cores to process instructions which, when executed, perform operations for system or user software. In some embodiments, at least one of the one or more processor cores is configured to process a specific instruction set. In some embodiments, instruction set may facilitate Complex Instruction Set Computing (CISC), Reduced Instruction Set Computing (RISC), or computing via a Very Long Instruction Word (VLIW). One or more processor cores may process a different instruction set which may include instructions to facilitate the emulation of other instruction sets. Processor core may also include other processing devices, such as a Digital Signal Processor (DSP).

In implementations of the disclosure, processing system 100 provides for improving remote traffic performance on cluster-aware processors. As shown in FIG. 1, processing system 100 may include, but is not limited to, a first CPU package 0 110 (CPU 0 110), a second CPU package 1 120 (CPU 1 120), and a memory device 130. Each of the CPU packages, CPU 0 110 and CPU 1 120, may further include CPU ports 112, 122 and system agents 115, 125. In some implementations, although not specifically depicted, CPU 0 110 and/or CPU 1 120 may include a multiple clusters and/or dies. More or less components than those illustrated in FIG. 1 may be included in processing system 100. The components of processing system 100 may be connected by way of a system bus or other electrical communication path (not shown). As discussed further below, the components of processing system 100 are operative to provide improving remote traffic performance on cluster-aware processors.

In implementations of the disclosure, processing system 100 may execute a boot process before the processing system 100 can be utilized for work. In one implementation, memory device 130, such as ROM or a flash memory such as non-volatile random access memory (NVRAM), may store platform initialization firmware 140 that includes program code containing the basic routines that help to start up the processing system 100 and to transfer information between elements within the processing system 100. In one implementation, platform initialization firmware 140 may include firmware that is compatible with the Extensible Firmware Interface (EFI) specification, the extension of the EFI interface referred to as Unified Extensible Firmware Interface (UEFI), or any other interface between the OS and the system firmware used for platform initialization.

Implementations of the disclosure provide for improving remote traffic performance of remote transactions between multiple CPU packages, such as CPU 0 110 and CPU 1 120. In some implementations, CPU 0 110 and CPU 1 120 may be cluster-aware processors of the processing system 100. Cluster-aware processors may refer to CPUs having a multi-die architecture that implements a cluster mode. As discussed above, the cluster mode divides the management system agents and memory controllers (including the cores) into several clusters, which have an even account of these system agents. The cores and management system agents in a cluster can access the memory controller in the same cluster with full bandwidth, which utilizes the maximum transaction capability among the core, the management system agents and the memory controllers in the same cluster.

However, the cluster mode does not include the CPU ports in each cluster. As a result, in a cluster mode, local memory access performance is improved, but there is a non-negligible latency increase experienced for remote traffic transactions. This is because the CPU ports are not binding to the clusters and the remote traffic is routed to all of the CPU ports on a CPU package evenly for balance.

The following example illustrates this non-negligible latency increase experienced for remote traffic transactions in cluster-aware processors. Assume a core tile6 belongs to cluster0 of a first CPU package, CPU0. Core tile 6 seeks to read/write the memory in remote cluster0 of a second CPU package CPU1 in the same processing system. In this example, based on the conventional routing methodology of the processing system, the address is routed to CPU port3. This means the request has to cross an MDL twice on CPU0 to reach the CPU0's port3; then the traffic reaches the CPU1's CPU port3, and the request is routed to the core tile6 in CPU1 for the memory access. As a result, this single remote request traffic crosses the MDL 4 times; and the return/completion message also follows the same routing to get back the requester (core tile 6 on CPU0) using the same 4 times MDL crossing for a total of 8 MDL crossings, resulting in around 56 ns latency in some conventional multi-die architectures, for example.

In a processing system that implements a non-cluster mode, the above-described technical problem also occurs on large CPU packages (which have extensive system agents) and/or when the CPU package is combined with several split dies. An illustrative example may include a remote traffic request from a core tile6 on a local CPU0 to access a remote memory address that is on CPU1's memory controller 1. In the example, the remote traffic may be routed to the CPU port3 on the CPU0 from core tile6 using a conventional routing methodology. After the remote traffic reaches the target remote CPU1, it may also be sent to the remote CPU1's core tile6 for the memory access. Then, CPU1's core tile6 can send the request to the memory controller1 in die1. In this example, the remote traffic can utilize, in some conventional architectures, 10 times MDL crossings, which results in approximately, for example, 70 ns latency.

Implementations of the disclosure provide for improved remote traffic performance on processor packages. In one implementation, the platform initialization firmware 140 to detect the CPU ports' locations in the CPU package and combine them with their adjacent system agents (such as the system management agents, memory controllers, cores, etc.). As a result, any remote traffic sent by the system agents can be sent out via the nearest CPU port. Further, the return/completion messages can also be routed back via the nearest CPU port on the remote CPU. This provides for the an efficient path for the remote traffic request and remote traffic return message among the CPUs.

In one implementation, the platform initialization firmware 140 includes a location mapping component 142 that detects the CPU ports' 112, 122 location in the CPU package 110, 120, the number of CPU ports 112, 122 (e.g., aligned with the number of clusters in cluster mode; even numbers), and the distance between the CPU ports 112, 122 and the other related system agents 115, 125. For example, in some processing system architectures, each system agent 115, 125 in the CPU package 110, 120 has its own location information, which can be marked as column x and row y on the CPU package (similar on the split-die configuration). The location mapping component 142 can determine the distance between the CPU ports 112, 122 and the related system agents 115, 125 using the location mapping, as shown in further detail with respect to FIG. 2.

Figure 2:
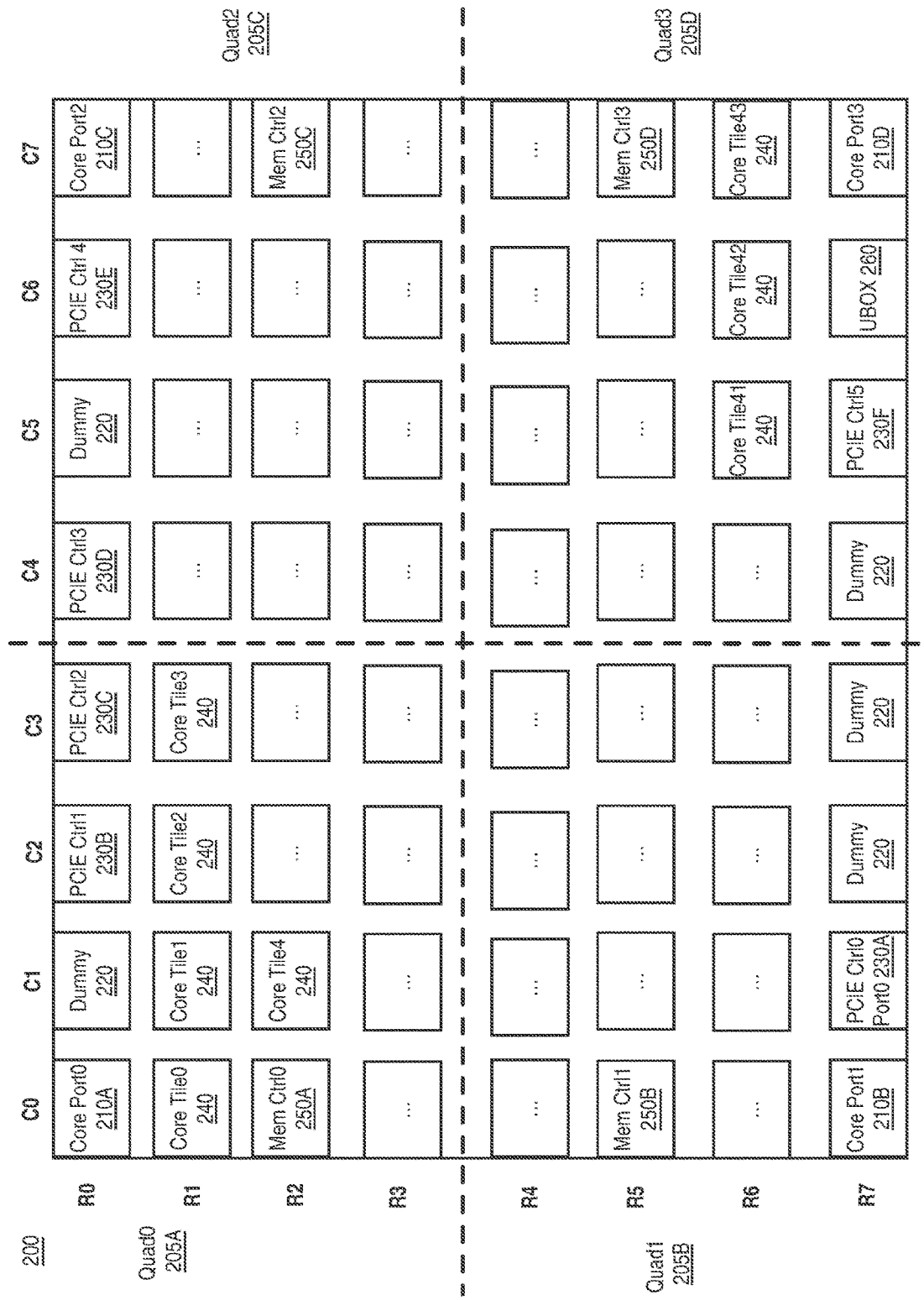
FIG. 2 is a block diagram of a central processing unit (CPU) package implementing improved remote traffic performance of cluster-aware processors, according to implementations of the disclosure.

FIG. 2 is a block diagram of a CPU package 200 implementing improved remote traffic performance of cluster-aware processors, according to implementations of the disclosure. In one implementation, CPU package 200 is the same as CPU 0 110 or CPU 1 120 described with respect to FIG. 1. CPU package 200 is one example of a CPU package utilizing implementations of the disclosure, however other types of CPU packages and/or other types of processors may utilize implementations of the disclosure.

CPU package 200 includes a plurality of core ports including core port0 210A, core port1 210B, core port2 210C, and core port3 210D (collectively referred to as core ports 210), a plurality of "dummy" components 220, a plurality of core tiles 240, a plurality of PCIe controllers including PCIe ctrl0 230A, PCIe ctrl1 230B, PCIe ctrl2 230C, PCIe ctrl3 230D, PCIe ctrl 4 230E, PCIe ctrl 5 230F (collectively referred to as PCIe controllers 230), a plurality of memory controllers including mem ctrl0 250A, mem ctrl1 250B, mem ctrl2 250C, mem ctrl3 250D (collectively referred to as memory controllers 250), and a UBOX component 260. Each component of the CPU package 200 may be associated with a particular row and column of the CPU package 200. The rows are identified as R0-R7 in the example of FIG. 2, while the columns are identified as C0-C7. In one implementation, the row and column corresponding to a particular component 210-260 of the CPU package 200 may be stored in a register associated with the particular component 210-250. The location mapping component 142 uses this location information as part of the location mapping discussed herein.

Referring back to FIG. 1, the platform initialization firmware 140 may also include a routing component 144 may then distribute the system agents 115, 125 according to their location and the package scope, and bind the nearest CPU port 112, 122 to the system agents 115, 125 accordingly. For example, with respect to FIG. 2, the CPU package 200 can be divided into four quadrants 205A, 205B, 205C, 205D, with a CPU port 210 associated with each quadrant 205A-205D. The routing component 144 can perform the related programming of routing structures 117, 127 of each system agent 115 according to the location mapping results. For example, with respect to the example CPU package 200 of FIG. 2, all system agents 210-260 within quad0 205A can be bound to core port0 210A, all system agents 210-260 within quad1 205B can be bound to core port1 210B, all system agents 210-260 within quad2 205C can be bound to core port2 210C, and all system agents 210-260 within quad4 205D can be bound to core port3 210D.

The final routing structure 117, 127 (e.g., a routing table) can be programmed to the corresponding registers of the system agents, which causes the remote traffic to be routed to the nearest CPU port 112, 122 by each system agent. Further details of improving remote traffic performance of the processing system 100 is described below with respect to FIGS. 3-7.

Figure 3:
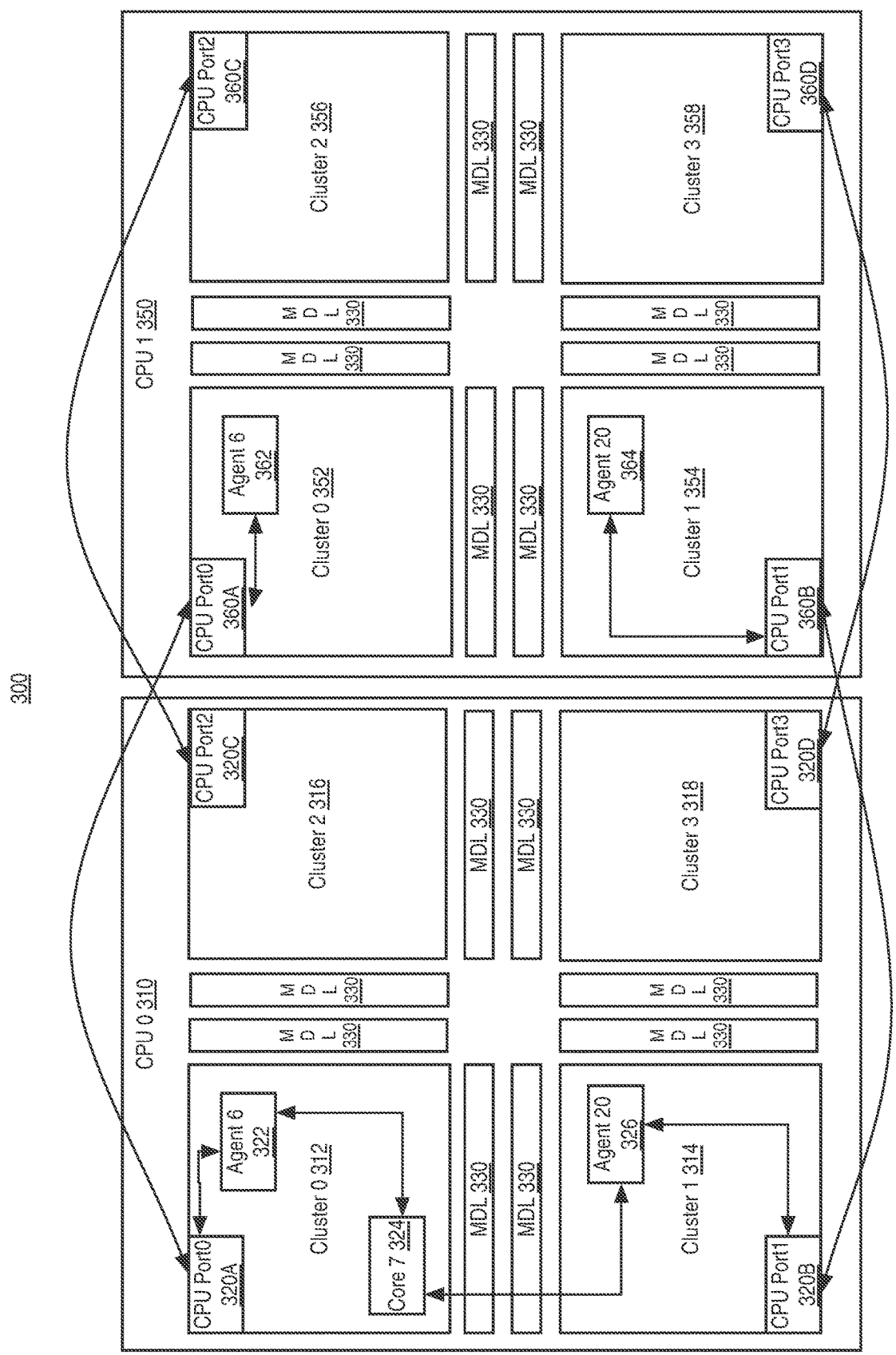
FIG. 3 is a block diagram illustrating a processing system to improve remote traffic performance of processors in cluster mode, according to implementations of the disclosure.

FIG. 3 is a block diagram illustrating a processing system 300 to improve remote traffic performance of processors in cluster mode, according to implementations of the disclosure. Processing system 300 includes a plurality of CPUs shown as CPU 0 310 and CPU 1 350. In one implementation, the CPUs 310, 350 may reside on the same processor package or on different processor packages. It is contemplated that embodiments are not limited to any particular implementation of processing system 300 and that one or more of its components (e.g., more or less CPU clusters, etc.) may be variously implemented in embodiments of the disclosure. Although CPUs 310, 350 are referred to as CPUs, other types of processors, such as GPUs are also contemplated in implementations of the disclosure, and the term "CPU" may connote a broad usage in implementations of the disclosure. In one implementation, any of CPUs 310, 350 may be the same as CPUs 110, 120 described with respect to FIG. 1 and/or CPU package 200 described with respect to FIG. 2.

As discussed above, implementations of the disclosure provide an approach to improve remote traffic performance of processors. Using implementations of the disclosure, remote traffic communications between the CPUs 310, 350 can be optimized by avoiding unnecessary MDL 330 crossings within the CPUs 310, 350 operating in cluster mode. For example, using the location mapping and CPU port route programming discussed above with respect to FIGS. 1 and 2, the system agents of each cluster 312, 314, 316, 318, 352, 354, 356, 358 of CPU 0 310 and CPU 1 350 can be bound to an associated CPU port 320A-320D, 360A-360D of each CPU 310, 350.

As shown in FIG. 3, processing system 300 depicts remote traffic routing to improve performance of CPUs 310, 350 operating in cluster mode. The remote traffic sent by the system agents (including agent 6 322, 362 and core 7 324) in the Cluster 0 312, 352 can target CPU port0 320A, 360A in both CPUs 310, 350. The remote traffic sent by the system agents 326, 364 in the Cluster1 314, 354 can target CPU port 1 320B, 360B in both CPUs 310, 350. The remote traffic sent by the system agents in the Cluster2 316, 356 can target CPU port2 320C, 360C in both CPUs 310, 350. The remote traffic sent by the system agents in the Cluster3 318, 358 can target CPU port3 320D, 360D in both CPUs 310, 350.

Figure 4:
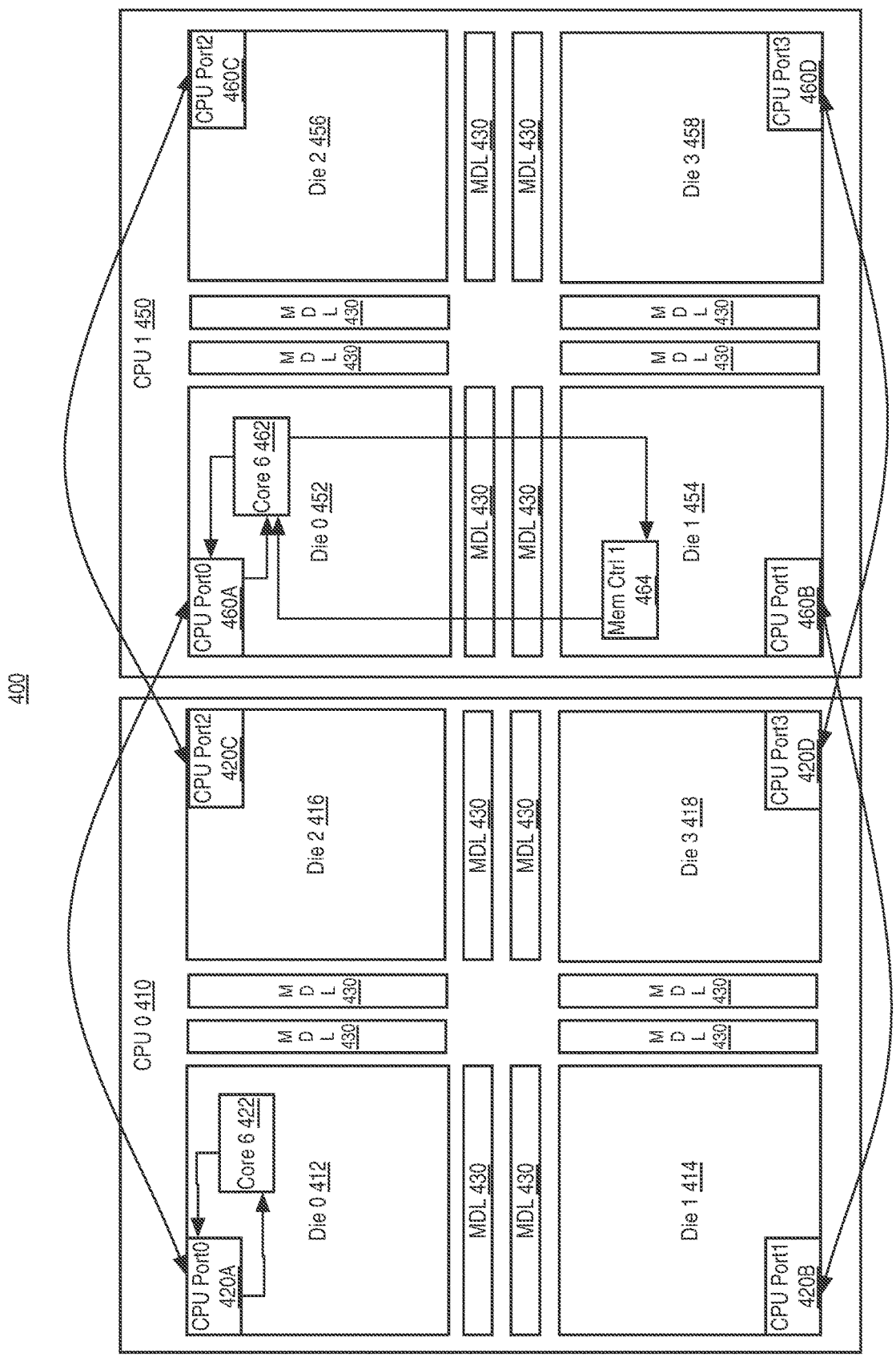
FIG. 4 is a block diagram illustrating a processing system to improve remote traffic performance of processors in non-cluster mode, according to implementations of the disclosure.
Figure 5:
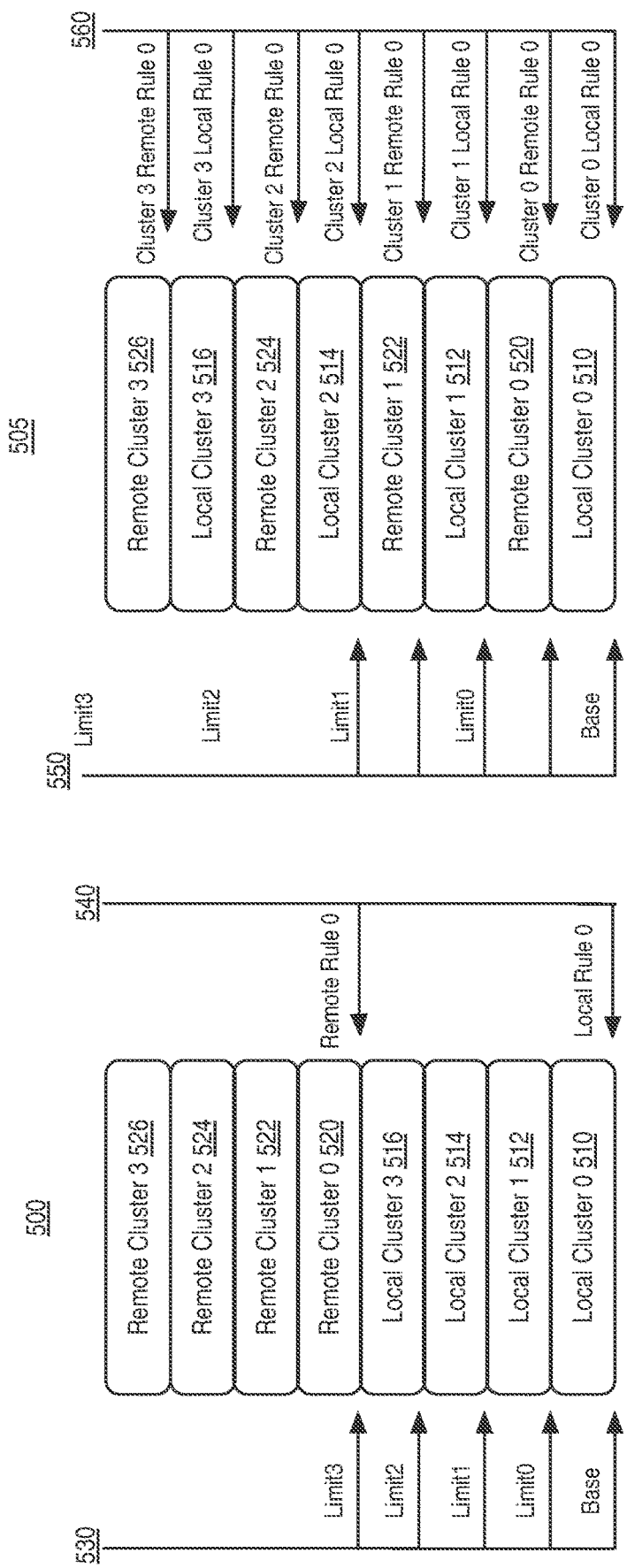
FIGS. 5A and 5B depict schematics for memory mapping programming for improving remote traffic performance in cluster-aware processors, in accordance with implementations of the disclosure.

FIG. 4 is a block diagram illustrating a processing system 400 to improve remote traffic performance of processors in non-cluster mode, according to implementations of the disclosure. Processing system 400 includes a plurality of CPUs shown as CPU 0 410 and CPU 1 450. In one implementation, the CPUs 410, 450 may reside on the same processor package or on different processor packages. It is contemplated that embodiments are not limited to any particular implementation of processing system 400 and that one or more of its components (e.g., more or less CPU dies, etc.) may be variously implemented in embodiments of the disclosure. Although CPUs 410, 450 are referred to as CPUs, other types of processors, such as GPUs are also contemplated in implementations of the disclosure, and the term "CPU" may connote a broad usage in implementations of the disclosure. In one implementation, any of CPUs 410, 450 may be the same as CPUs 110, 120 described with respect to FIG. 1 and/or CPU package 200 described with respect to FIG. 2.

As discussed above, implementations of the disclosure provide an approach to improve remote traffic performance of processors. FIG. 3 depicted improving remote traffic performance of processors operating cluster mode. FIG. 4 depicts improving remote traffic performance in the corollary case of processors operating in a non-cluster mode.

Using implementations of the disclosure, remote traffic communications between the CPUs 410, 450 can be optimized by avoiding the unnecessary MDL 430 crossings within the CPUs 410, 450 operating in non-cluster mode. For example, using the location mapping and CPU port route programming discussed above with respect to FIGS. 1 and 2, the system agents of each die 412, 414, 416, 418, 452, 454, 456, 458 of CPU 0 410 and CPU 1 450 can be bound to an associated CPU port 420A-420D, 460A-460D of each CPU 410, 450.

As shown in FIG. 4, processing system 400 depicts remote traffic routing to improve performance of CPUs 410, 450 operating in non-cluster mode. The remote traffic sent by the system agents (including core 6 422, 462) in the die 0 412, 452 can target CPU port0 420A, 460A in both CPUs 410, 450. The remote traffic sent by the system agents (including mem ctrl 464) in the die 1 414, 454 can target CPU port1 420B, 460B in both CPUs 410, 450. The remote traffic sent by the system agents in the die 2 416, 456 can target CPU port2 420C, 460C in both CPUs 410, 450. The remote traffic sent by the system agents in the die 3 418, 458 can target CPU port3 420D, 460D in both CPUs 410, 450.

FIGS. 5A and 5B depict schematics 500, 505 for memory mapping programming for improving remote traffic performance in cluster-aware processors, in accordance with implementations of the disclosure. Schematics 500 and 505 illustrate memory mapping programming of system agents of a CPU operating in cluster mode. In one implementation, the CPU may be the same as CPUs 110, 120 described with respect to FIG. 1, CPU package 200 described with respect to FIG. 2, and/or CPUs 310, 350 described with respect to FIG. 3.

When a CPU is operating cluster mode, implementations of the disclosure may modify the memory range programming on system management agents (e.g., CHA) as well as the cluster memory range on cores of the CPUs. With respect to FIG. 5A, schematic 500 depicts memory mapping programming on cores 530 and system management agents 540 in conventional systems. The CPU0's core 530 is shown to have its own memory map information (for local cluster 0 510, local cluster 1 512, local cluster 2 514, and local cluster 3 516) and not the memory map information from the remote CPU (including remote cluster 0 520, remote cluster 1 522, remote cluster 2 524, and remote cluster 3 526). If there is a remote memory access (i.e., for remote cluster 0-3 520-526 on the remote CPU), the remote transactions may use all of the CPU ports on local CPU evenly. This is because the remote memory access uses the conventional address hash mechanism to select the system management agent on the local CPU in this case, and then the system management agent sends out the remote traffic to its binding CPU port. In this situation, there is a resulting performance impact.

With respect to FIG. 5B, schematic 505 illustrates a modified memory mapping for system management agents and cores in accordance with implementations of the disclosure. In this modified memory mapping, the cores 550 have the whole memory map information of the local CPU and the remote CPU. The core 550 can send a remote memory access to the destination system management agent correctly. As the cores 550 can decide which cluster 510-516, 520-526 the memory access is in by checking the memory address with the memory ranges on the cores, then the remote memory access can send to the system management agent in the cluster and send to the remote CPU's target cluster via the binding CPU port on the local CPU.

In one implementation, the platform initialization firmware 140 described with respect to FIG. 1 may be responsible for maintaining the memory mapping programming. To build the memory mapping in cluster mode, the platform initialization firmware 140 may build the memory map with local CPU cluster 0 510 memory range followed by the remote CPU cluster 0 520 memory range; local CPU cluster 1 memory range 512 followed by remote CPU cluster 1 522 memory range; local CPU cluster 2 memory range 514 followed by remote CPU cluster 2 524 memory range; and local CPU cluster 3 memory range 516 followed by remote CPU cluster 3 526 memory range.

As for the local CPU's perspective, the system management agents' programming 560 should mark its local clusters memory as local, and the clusters memory in the remote CPU as remote. For the core side cluster memory range programming 550, it should combine the local cluster 0 memory range 510 and remote cluster 0 memory range 520 as its cluster 0's memory range, and so on with the remaining clusters. In that way, if a core's request memory address falls in the one of the clusters, the request can be transferred to the system management agent of the cluster to handle. If the address is local, it can go to the local memory controller in the cluster. If the address is remote, it can be sent to the binding CPU port and reach the remote system management agent. The request then can reach the remote memory controller in remote CPU's cluster.

Figure 6:
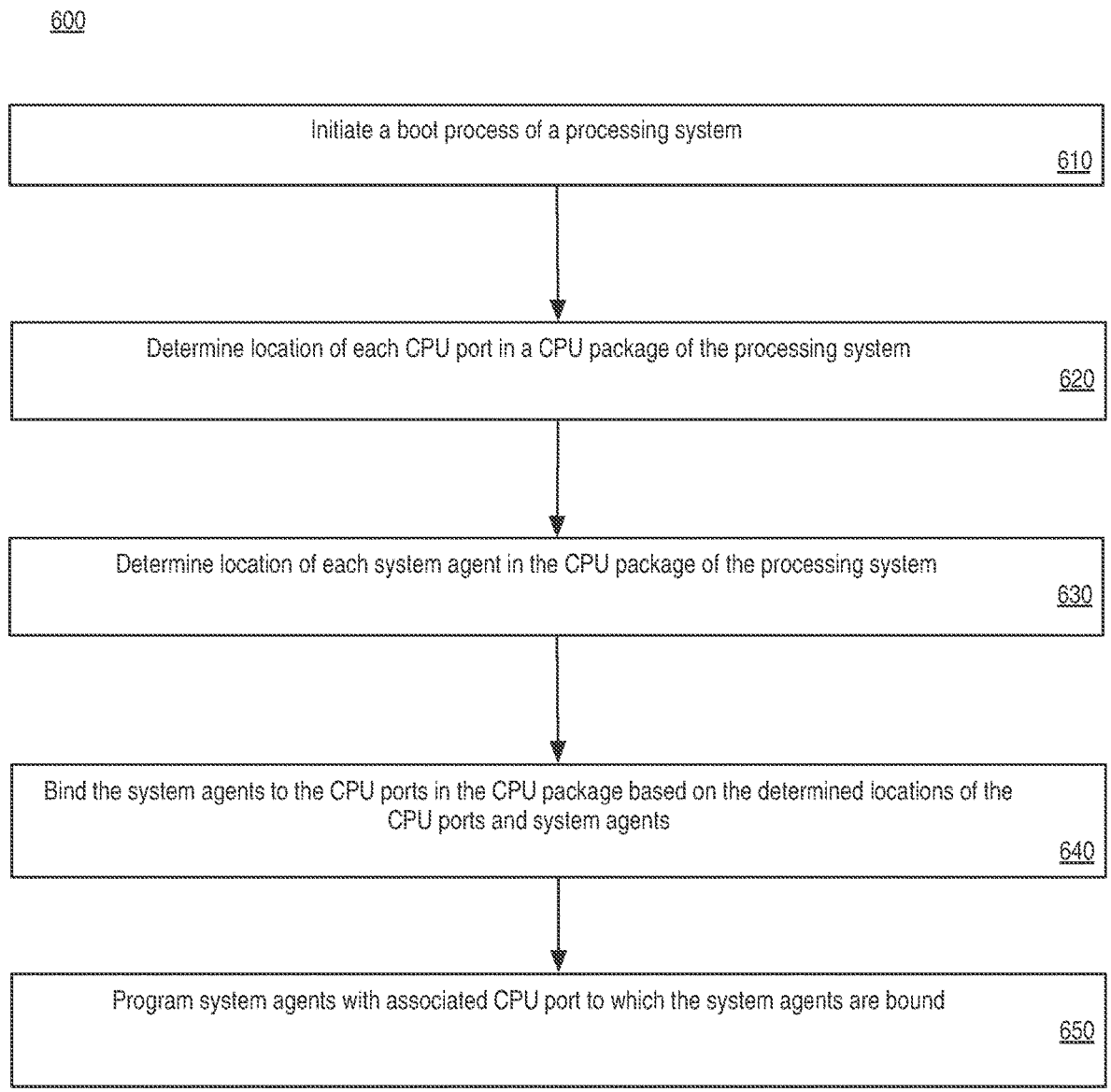
FIG. 6 illustrates an example flow for improving remote traffic performance on cluster-aware processors, in accordance with implementations of the disclosure.

FIG. 6 illustrates an example flow 600 for improving remote traffic performance on cluster-aware processors, in accordance with implementations of the disclosure. The various operations of the flow may be performed by any suitable circuitry, such as a controller of a host computing device, a controller of a memory module, or other components of a computing device. The example flow 600 may be representative of some or all the operations that may be executed by or implemented on one or more components of processing system 100 FIG. 1, such as by platform initialization firmware 140 described with respect to FIG. 1. The embodiments are not limited in this context.

At block 610, the processor may initiate a boot process of a processing system. In one implementation, the boot process is provided by a firmware initialization component and may include a location mapping component and a routing component. At block 620, the processor may determine a location of each CPU port in a CPU package of the processing system. In one implementation, the determination of the location of the CPU ports is part of the boot process.

At block 630, the processor may determine locations of each system agent in the CPU package. For example, in some processing system architectures, each system agent in the CPU package has its own location information, which can be marked as column x and row y on the CPU package. At block 640, the processor may bind system agents to the CPU ports in the CPU package based on the determined locations of the CPU ports and the system agents. In one implementations, the distance between each of the CPU ports and the system agents is determined using the location mapping, and the system agents are bound to the CPU port that is determined to be closest to the system agent.

Lastly, at block 650, the processor may program the system agents with the associated CPU port to which the system agent is bound. In one implementation, a routing structure (e.g., a routing table) can be programmed to the corresponding registers of the system agents with the CPU port that the system agent is bound to.

Some of the operations illustrated in FIG. 6 may be repeated, combined, modified or deleted where appropriate, and additional steps may also be added to the flow in various embodiments. Additionally, steps may be performed in any suitable order without departing from the scope of particular embodiments.

FIG. 7 illustrates an example flow 700 for improving remote traffic performance on cluster-aware processors, in accordance with implementations of the disclosure. The various operations of the flow may be performed by any suitable circuitry, such as a controller of a host computing device, a controller of a memory module, or other components of a computing device. The example flow 700 may be representative of some or all the operations that may be executed by or implemented on one or more components of processing system 100 FIG. 1, such as by platform initialization firmware 140 described with respect to FIG. 1. The embodiments are not limited in this context.

At block 710, the processor may determine locations of CPU ports and system agents in a local CPU package. At block 720, the processor may bind the system agents to the CPU ports in the local CPU package based on the determined locations of the CPU ports and the system agents. In one implementations, the distance between each of the CPU ports and the system agents is determined using the location mapping, and the system agents are bound to the CPU port that is determined to be closest to the system agent.

At block 730, the processor may modify cluster memory mapping of the cores of the local CPU package to combine same clusters of the local CPU package with corresponding remote clusters of a remote CPU package. In one implementation, same cluster may refer to a local cluster 0 is combined with a remote cluster 0, and so on. Lastly, at block 740, the processor may program system agents, including cores, with the associated CPU port to which the system agent is bound and program the cores with the modified cluster memory mapping.

Some of the operations illustrated in FIG. 7 may be repeated, combined, modified or deleted where appropriate, and additional steps may also be added to the flow in various embodiments. Additionally, steps may be performed in any suitable order without departing from the scope of particular embodiments.

Figure 8:
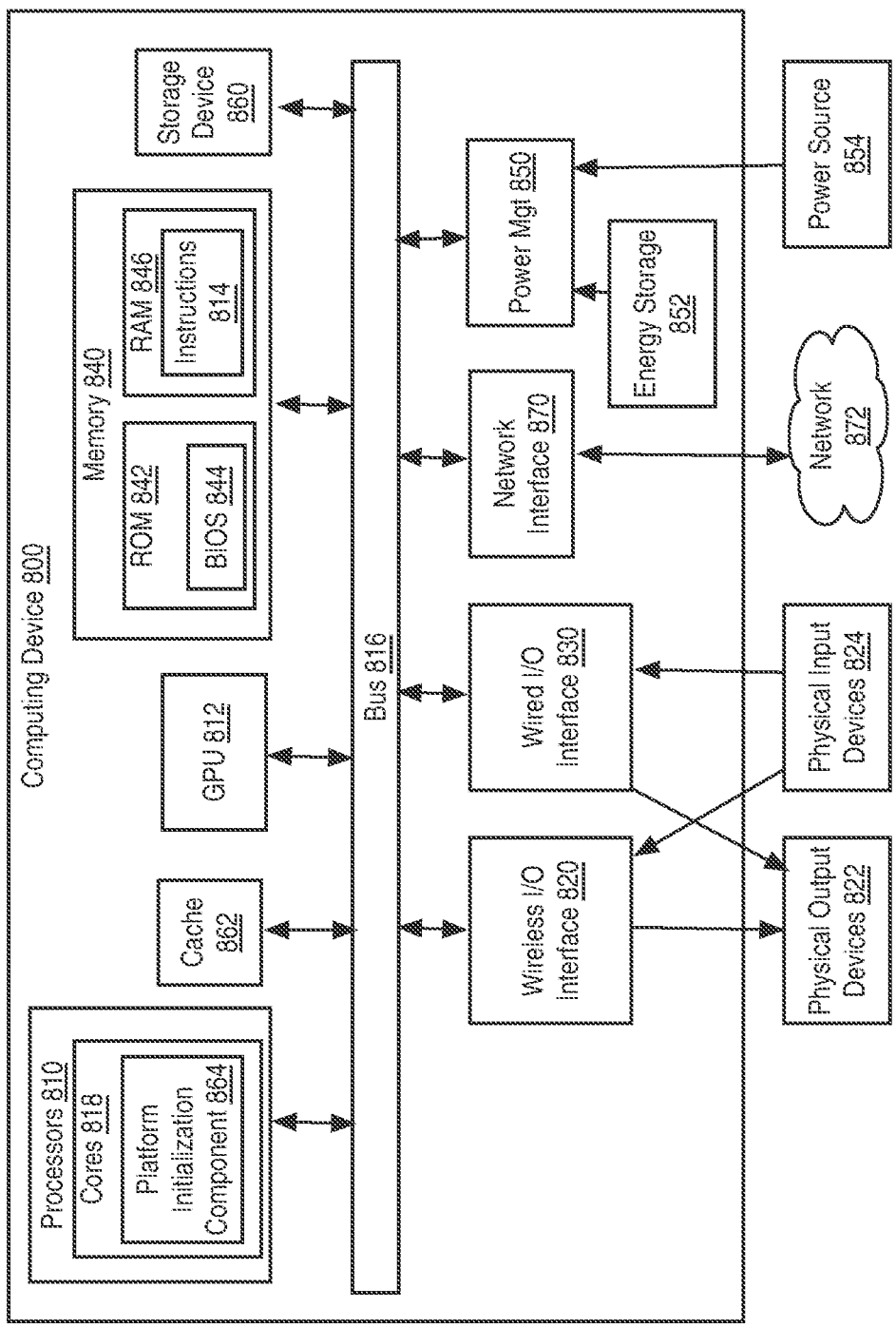
FIG. 8 is a schematic diagram of an illustrative electronic computing device to enable improving remote traffic performance on cluster-aware processors, according to some implementations.

FIG. 8 is a schematic diagram of an illustrative electronic computing device to enable improving remote traffic performance on cluster-aware processors, according to some implementations. In some embodiments, the computing device 800 includes one or more processors 810 including one or more processors dies (e.g., cores) 818 each including a platform initialization component 864, such as a component to execute platform initialization firmware 140 described with respect to FIG. 1. In some embodiments, the computing device is to provide improving remote traffic performance on cluster-aware processors by utilizing the platform initialization component 864, as provided in FIGS. 1-7.

The computing device 800 may additionally include one or more of the following: cache 862, a graphical processing unit (GPU) 812 (which may be the hardware accelerator in some implementations), a wireless input/output (I/O) interface 820, a wired I/O interface 830, system memory 840 (e.g., memory circuitry), power management circuitry 850, non-transitory storage device 860, and a network interface 870 for connection to a network 872. The following discussion provides a brief, general description of the components forming the illustrative computing device 800. Example, non-limiting computing devices 800 may include a desktop computing device, blade server device, workstation, or similar device or system.

In embodiments, the processor cores 818 are capable of executing machine-readable instruction sets 814, reading data and/or instruction sets 814 from one or more storage devices 860 and writing data to the one or more storage devices 860. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 818 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 800 includes a bus or similar communications link 816 that communicably couples and facilitates the exchange of information and/or data between various system components including the processor cores 818, the cache 862, the graphics processor circuitry 812, one or more wireless I/O interfaces 820, one or more wired I/O interfaces 830, one or more storage devices 860, and/or one or more network interfaces 870. The computing device 800 may be referred to in the singular herein, but this is not intended to limit the embodiments to a single computing device 800, since in certain embodiments, there may be more than one computing device 800 that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks are not described in further detail herein, as they should be understood by those skilled in the relevant art. The bus 816 that interconnects at least some of the components of the computing device 800 may employ any currently available or future developed serial or parallel bus structures or architectures.

The system memory 840 may include read-only memory ("ROM") 842 and random access memory ("RAM") 846. A portion of the ROM 842 may be used to store or otherwise retain a basic input/output system ("BIOS") 844. The BIOS 844 provides basic functionality to the computing device 800, for example by causing the processor cores 818 to load and/or execute one or more machine-readable instruction sets 814. In embodiments, at least some of the one or more machine-readable instruction sets 814 cause at least a portion of the processor cores 818 to provide, create, produce, transition, and/or function as a dedicated, specific, and particular machine, for example a word processing machine, a digital image acquisition machine, a media playing machine, a gaming system, a communications device, a smartphone, or similar.

The computing device 800 may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The computing device 800 may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include, but are not limited to, universal serial bus (USB), IEEE 1394 ("Fire-Wire"), and similar.

The computing device 800 may include one or more communicably coupled, non-transitory, data storage devices 860. The data storage devices 860 may include one or more hard disk drives (HDDs) and/or one or more solid-state storage devices (SSDs). The one or more data storage devices 860 may include any current or future developed storage appliances, network storage devices, and/or systems. Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the computing device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830 (e.g., Universal Serial Bus or USB); one or more wireless communications interfaces 820 (e.g., Bluetooth®, Near Field Communication or NFC); and/or one or more network interfaces 870 (IEEE 802.3 or Ethernet, IEEE 802.11, or Wi-Fi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 818 and/or graphics processor circuitry 812.

The computing device 800 may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the computing device 800. The power source 854 may include, but is not limited to, a solar power system, a commercial electric grid, a portable generator, an external energy storage device, or any combination thereof.

For convenience, the processor cores 818, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

The following examples pertain to further embodiments. Example 1 is a system to facilitate improving remote traffic performance on cluster-aware processors. The system of Example 1 comprises at least one processor package comprising a plurality of processor ports and a plurality of system agents, and a memory device to store platform initialization firmware to cause the processing system to: determine first locations of the plurality of processor ports in the at least one processor package; determine second locations of the plurality of system agents in the at least one processor package; associate each of the processor ports with a set of the plurality of system agents based on the determined first and second locations; and program the plurality of system agents with the associated processor port for the respective system agent.

In Example 2, the subject matter of Example 1 can optionally include wherein the first locations and the second locations comprise a row and a column position on the at least one processor package. In Example 3, the subject matter of any one of Examples 1-2 can optionally include wherein associating each of the processor ports with the set of the plurality of system agents comprises, for each of the plurality of system agents, binding a processor port of the plurality of processor ports that is closest to the system agent based on the determined first and second locations.

In Example 4, the subject matter of any one of Examples 1-3 can optionally include wherein the at least one processor package comprises at least one central processing unit (CPU) or graphics processing unit (GPU). In Example 5, the subject matter of any one of Examples 1-4 can optionally include wherein the at least one processor package comprises a plurality of clusters. In Example 6, the subject matter of any one of Examples 1-5 can optionally include wherein the at least one processor package comprises a plurality of dies.

In Example 7, the subject matter of any one of Examples 1-6 can optionally include wherein programming the plurality of system agents further comprises, for each of the plurality of system agents, programming a register of the system agent with the associated processor port. In Example 8, the subject matter of any one of Examples 1-7 can optionally include wherein the platform initialization firmware to further cause the processing system to modify a cluster memory mapping of cores of the at least one processor package to combine same local clusters of the at least one processor package with corresponding remote clusters of a remote processor package.

In Example 9, the subject matter of any one of Examples 1-8 can optionally include wherein the system agents comprise at least one of a processor core, a memory controller, a peripheral component interconnect express (PCIe) controller, or a system management agent. In Example 10, the subject matter of any one of Examples 1-9 can optionally include wherein the plurality of system agents are programmed to utilize the associated processor port to route remote traffic from the plurality of system agents.

Example 11 is a method for facilitating improving remote traffic performance on cluster-aware processors. The method of Example 11 can optional include determining first locations of a plurality of processor ports in at least one processor package; determining second locations of a plurality of system agents in the at least one processor package; associating each of the processor ports with a set of the plurality of system agents based on the determined first and second locations; and programming the plurality of system agents with the associated processor port for the respective system agent.

In Example 12, the subject matter of Example 11 can optionally include wherein associating each of the processor ports with the set of the plurality of system agents further comprises, for each of the plurality of system agents, binding a processor port of the plurality of processor ports that is closest to the system agent based on the determined first and second locations.

In Example 13, the subject matter of any one of Examples 11-12 can optionally include further comprising modifying a cluster memory mapping of cores of the at least one processor package to combine same local clusters of the at least one processor package with corresponding remote clusters of a remote processor package. In Example 14, the subject matter of any one of Examples 11-13 can optionally include wherein the system agents comprise at least one of a processor core, a memory controller, a peripheral component interconnect express (PCIe) controller, or a system management agent. In Example 15, the subject matter of any one of Examples 11-14 can optionally include wherein the plurality of system agents are programmed to utilize the associated processor port to route remote traffic from the plurality of system agents.

Example 16 is a non-transitory computer-readable storage medium for facilitating improving remote traffic performance on cluster-aware processors. The at non-transitory computer-readable storage medium of Example 16 comprises executable computer program instructions that, when executed by one or more processors, cause the one or more processors to perform operations comprising: determining first locations of a plurality of processor ports in at least one processor package; determining second locations of a plurality of system agents in the at least one processor package; associating each of the processor ports with a set of the plurality of system agents based on the determined first and second locations; and programming the plurality of system agents with the associated processor port for the respective system agent.

In Example 17, the subject matter of Example 16 can optionally include wherein associating each of the processor ports with the set of the plurality of system agents further comprises, for each of the plurality of system agents, binding a processor port of the plurality of processor ports that is closest to the system agent based on the determined first and second locations. In Example 18, the subject matter of any one of Examples 16-17 can optionally include wherein the operations further comprise modifying a cluster memory mapping of cores of the at least one processor package to combine same local clusters of the at least one processor package with corresponding remote clusters of a remote processor package.

In Example 19, the subject matter of any one of Examples 16-18 can optionally include wherein the system agents comprise at least one of a processor core, a memory controller, a peripheral component interconnect express (PCIe) controller, or a system management agent. In Example 20, the subject matter of any one of Examples 16-19 can optionally include wherein the plurality of system agents are programmed to utilize the associated processor port to route remote traffic from the plurality of system agents.

Example 21 is an apparatus to improving remote traffic performance on cluster-aware processors. The apparatus of Example 21 comprises a memory device to store platform initialization firmware to cause a processing system to: determine first locations of a plurality of processor ports in at least one processor package; determine second locations of a plurality of system agents in the at least one processor package; associate each of the processor ports with a set of the plurality of system agents based on the determined first and second locations; and program the plurality of system agents with the associated processor port for the respective system agent.

In Example 22, the subject matter of Example 21 can optionally include wherein associating each of the processor ports with the set of the plurality of system agents further comprises, for each of the plurality of system agents, binding a processor port of the plurality of processor ports that is closest to the system agent based on the determined first and second locations.

In Example 23, the subject matter of any one of Examples 21-22 can optionally include further comprising modifying a cluster memory mapping of cores of the at least one processor package to combine same local clusters of the at least one processor package with corresponding remote clusters of a remote processor package. In Example 24, the subject matter of any one of Examples 21-23 can optionally include wherein the system agents comprise at least one of a processor core, a memory controller, a peripheral component interconnect express (PCIe) controller, or a system management agent. In Example 25, the subject matter of any one of Examples 21-24 can optionally include wherein the plurality of system agents are programmed to utilize the associated processor port to route remote traffic from the plurality of system agents.

Example 26 is an apparatus for facilitating improving remote traffic performance on cluster-aware processors according to implementations of the disclosure. The apparatus of Example 26 can comprise means for determining first locations of a plurality of processor ports in at least one processor package; means for determining second locations of a plurality of system agents in the at least one processor package; means for associating each of the processor ports with a set of the plurality of system agents based on the determined first and second locations; and means for programming the plurality of system agents with the associated processor port for the respective system agent.

In Example 27, the subject matter of Example 26 can optionally include the apparatus further configured to perform the method of any one of the Examples 12 to 15.

Example 28 is at least one machine readable medium comprising a plurality of instructions that in response to being executed on a computing device, cause the computing device to carry out a method according to any one of Examples 11-15. Example 29 is an apparatus for facilitating improving remote traffic performance on cluster-aware processors, configured to perform the method of any one of Examples 11-15. Example 30 is an apparatus for facilitating improving remote traffic performance on cluster-aware processors comprising means for performing the method of any one of claims 11 to 15. Specifics in the Examples may be used anywhere in one or more embodiments.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium (e.g., non-transitory computer-readable storage medium) having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A processing system comprising:
    at least one processor package comprising a plurality of processor ports and a plurality of system agents; and
    a memory device to store platform initialization firmware to cause the processing system to:
        determine first locations of the plurality of processor ports in the at least one processor package;
        determine second locations of the plurality of system agents in the at least one processor package;
        associate each of the plurality of processor ports with a set of the plurality of system agents based on the first locations and the second locations; and
        program the plurality of system agents with the associated processor port for the respective system agent.

2. The processing system of claim 1, wherein the first locations and the second locations comprise a row and a column position on the at least one processor package.

3. The processing system of claim 1, wherein associating each of the plurality of processor ports with the set of the plurality of system agents comprises, for each of the plurality of system agents, binding a processor port of the plurality of processor ports that is closest to the system agent based on the first locations and the second locations.

4. The processing system of claim 1, wherein the at least one processor package comprises at least one central processing unit (CPU) or graphics processing unit (GPU).

5. The processing system of claim 1, wherein the at least one processor package comprises a plurality of clusters.

6. The processing system of claim 1, wherein the at least one processor package comprises a plurality of dies.

7. The processing system of claim 1, wherein programming the plurality of system agents further comprises, for each of the plurality of system agents, programming a register of the system agent with the associated processor port.

8. The processing system of claim 1, wherein the platform initialization firmware to further cause the processing system to modify a cluster memory mapping of cores of the at least one processor package to combine same local clusters of the at least one processor package with corresponding remote clusters of a remote processor package.

9. The processing system of claim 1, wherein the plurality of system agents comprise at least one of a processor core, a memory controller, a peripheral component interconnect express (PCIe) controller, or a system management agent.

10. The processing system of claim 1, wherein the plurality of system agents are programmed to utilize the associated processor port to route remote traffic from the plurality of system agents.

11. A method comprising:
executing, by processor hardware circuitry of at least one processor package comprising a plurality of processor ports and a plurality of system agents, platform initialization firmware stored in a memory device communicably coupled to the processor hardware circuitry;
determining, by the processor hardware circuitry using the platform initialization firmware, first locations of the plurality of processor ports in the at least one processor package;
determining, by the processor hardware circuitry using the platform initialization firmware, second locations of the plurality of system agents in the at least one processor package;
associating, by the processor hardware circuitry using the platform initialization firmware, each of the plurality of processor ports with a set of the plurality of system agents based on the first locations and the second locations; and
programming, by the processor hardware circuitry using the platform initialization firmware, the plurality of system agents with the associated processor port for the respective system agent.

12. The method of claim 11, wherein associating each of the plurality of processor ports with the set of the plurality of system agents further comprises, for each of the plurality of system agents, binding a processor port of the plurality of processor ports that is closest to the system agent based on the first locations and the second locations.

13. The method of claim 11, further comprising modifying a cluster memory mapping of cores of the at least one processor package to combine same local clusters of the at least one processor package with corresponding remote clusters of a remote processor package.

14. The method of claim 11, wherein the plurality of system agents comprise at least one of a processor core, a memory controller, a peripheral component interconnect express (PCIe) controller, or a system management agent.

15. The method of claim 11, wherein the plurality of system agents are programmed to utilize the associated processor port to route remote traffic from the plurality of system agents.

16. A non-transitory computer-readable storage medium having stored thereon executable computer program instructions that, when executed by one or more processors, cause the one or more processors to perform operations comprising:
executing, by the one or more processors of at least one processor package comprising a plurality of processor ports and a plurality of system agents, platform initialization firmware stored in a memory device communicably coupled to the one or more processors;
determining, by the one or more processors using the platform initialization firmware, first locations of the plurality of processor ports in the at least one processor package;
determining, by the one or more processors using the platform initialization firmware, second locations of the plurality of system agents in the at least one processor package;
associating, by the one or more processors using the platform initialization firmware, each of the plurality of processor ports with a set of the plurality of system agents based on the first locations and the second locations; and
programming, by the one or more processors using the platform initialization firmware, the plurality of system agents with the associated processor port for the respective system agent.

17. The non-transitory computer-readable storage medium of claim 16, wherein associating each of the plurality of processor ports with the set of the plurality of system agents further comprises, for each of the plurality of system agents, binding a processor port of the plurality of processor ports that is closest to the system agent based on the first locations and the second locations.

18. The non-transitory computer-readable storage medium of claim 16, wherein the operations further comprise modifying a cluster memory mapping of cores of the at least one processor package to combine same local clusters of the at least one processor package with corresponding remote clusters of a remote processor package.

19. The non-transitory computer-readable storage medium of claim 16, wherein the plurality of system agents comprise at least one of a processor core, a memory controller, a peripheral component interconnect express (PCIe) controller, or a system management agent.

20. The non-transitory computer-readable storage medium of claim 16, wherein the plurality of system agents are programmed to utilize the associated processor port to route remote traffic from the plurality of system agents.

* * * * *